May 13, 1947.　　　I. E. DORSCHNER　　　2,420,470
CORN HARVESTER
Filed Oct. 12, 1944　　　5 Sheets-Sheet 1

Irvin E. Dorschner
INVENTOR.
BY
ATTORNEYS.

May 13, 1947.  I. E. DORSCHNER  2,420,470
CORN HARVESTER
Filed Oct. 12, 1944  5 Sheets-Sheet 2

Irvin E. Dorschner
INVENTOR.

BY Ch Snowles.
ATTORNEYS.

May 13, 1947.     I. E. DORSCHNER     2,420,470
CORN HARVESTER
Filed Oct. 12, 1944     5 Sheets-Sheet 5
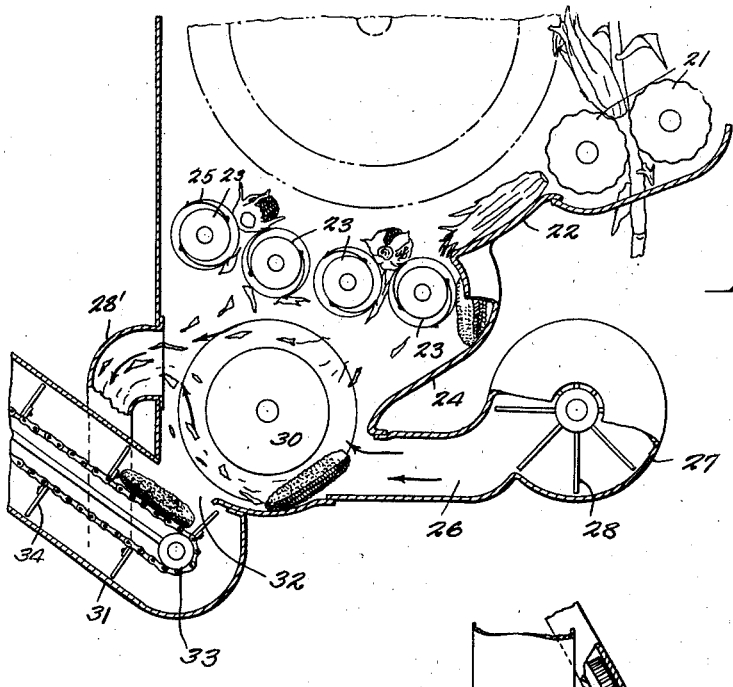
Fig. 5.
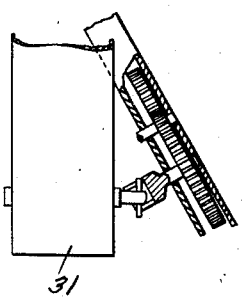
Fig. 8.
Fig. 9.
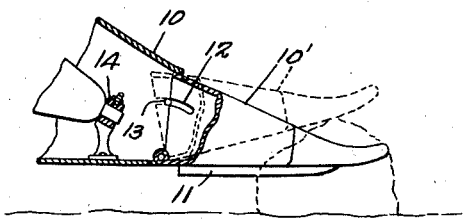
Irvin E. Dorschner
INVENTOR.
BY *C. A. Snow & Co.*
ATTORNEYS.

Patented May 13, 1947

2,420,470

UNITED STATES PATENT OFFICE 2,420,470

CORN HARVESTER

Irvin E. Dorschner, Spirit Lake, Iowa

Application October 12, 1944, Serial No. 558,353

3 Claims. (Cl. 56—18)

This invention relates to a combined corn harvester and husking machine, the primary object of the invention being to provide a machine which, when moved along rows of corn, will snap the ears of corn from the standing stalks and carry the corn through the machine, where the husks are removed and the husked ears of corn conveyed to a place of deposit.

An important object of the invention is to provide a machine of this character which will be operated through gearing, eliminating the use of chains or belts which frequently break and which require constant adjustment, necessitating stopping the machine with a waste of time and labor.

Another object of the invention is to provide a machine for harvesting corn, which may be hitched to the usual tractor, means being provided to take off power from the tractor for operating the machinery of the corn harvester.

With the foregoing and other objects in view, which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

Referring to the drawings,

Figure 5 is a sectional view taken on line 5—5 of Figure 3.

Figure 7 is a view illustrating the power shaft of the machine.

Figure 8 is a view illustrating the power take-off for the endless carrier of the machine.

Figure 9 is an elevational view partly in section, illustrating the pivoted end sections of the feed worm housings.

Figure 1:
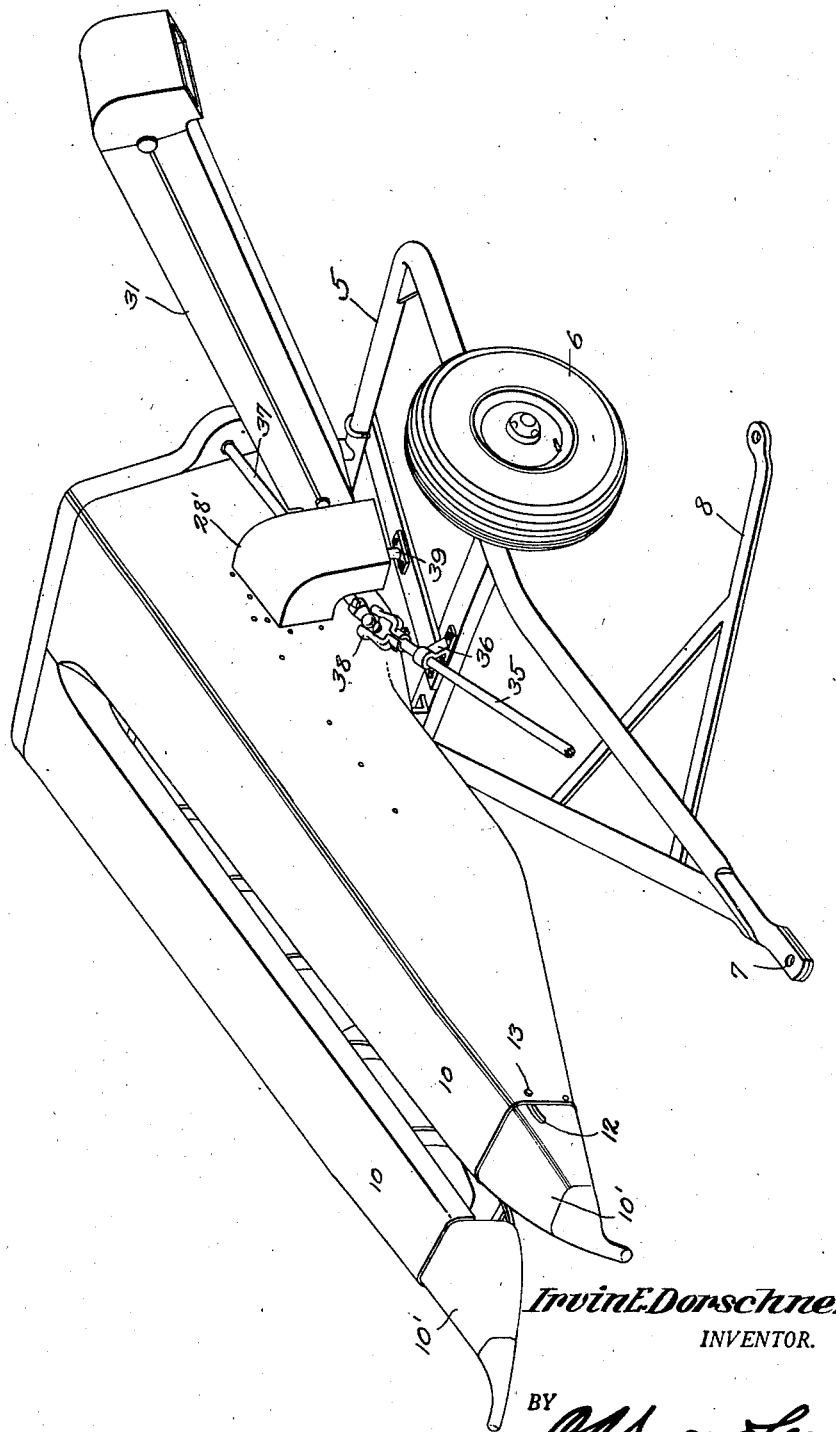
Figure 1 is a perspective view of a corn harvesting machine, constructed in accordance with the invention.

Referring to the drawings in detail, the machine comprises a frame indicated generally by the reference character 5, the frame being supported on the wheels 6, whereby the machine may be moved over the ground surface.

Figure 2:
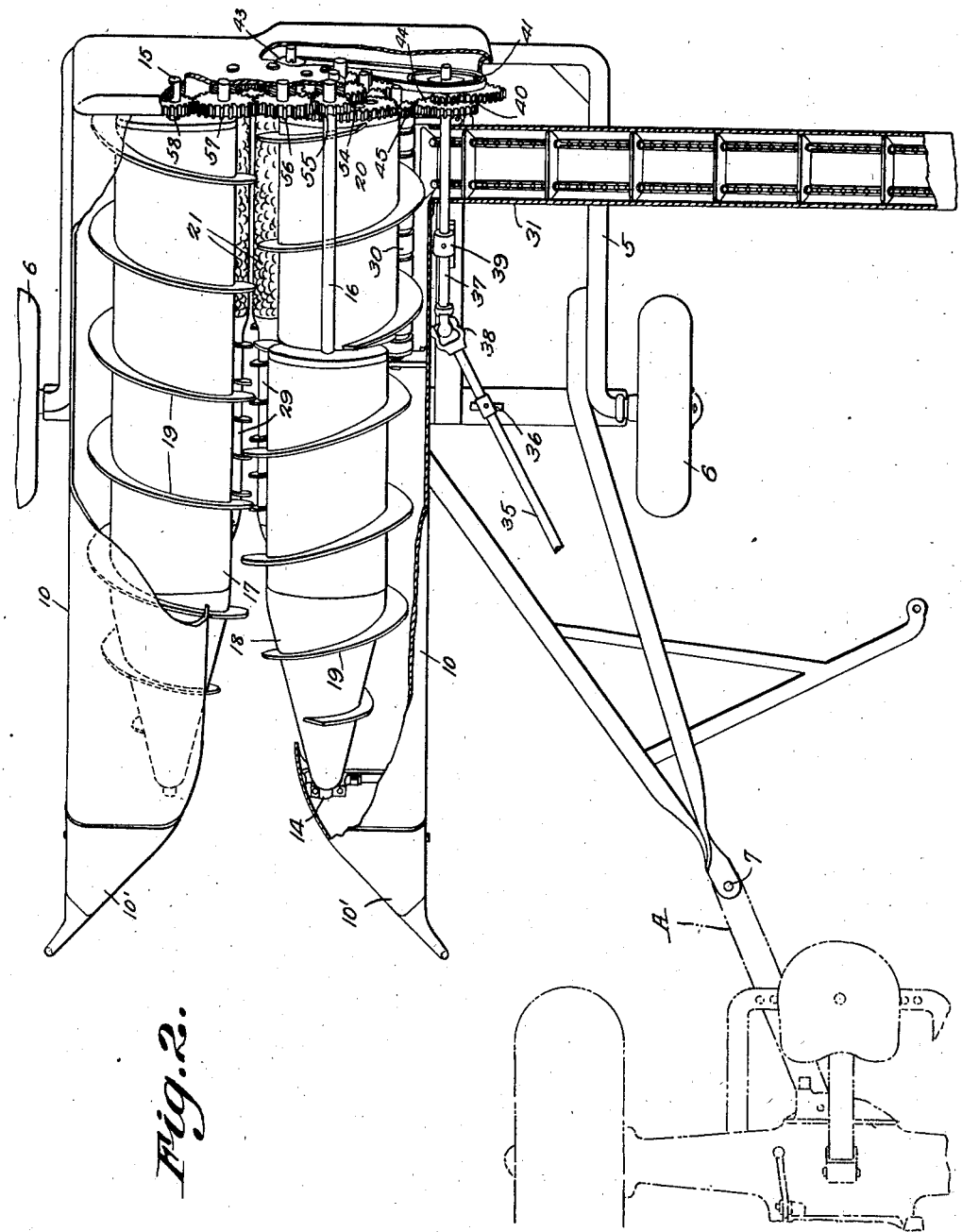
Figure 2 is a plan view of the machine, portions of the housing being broken away.
Figure 3:
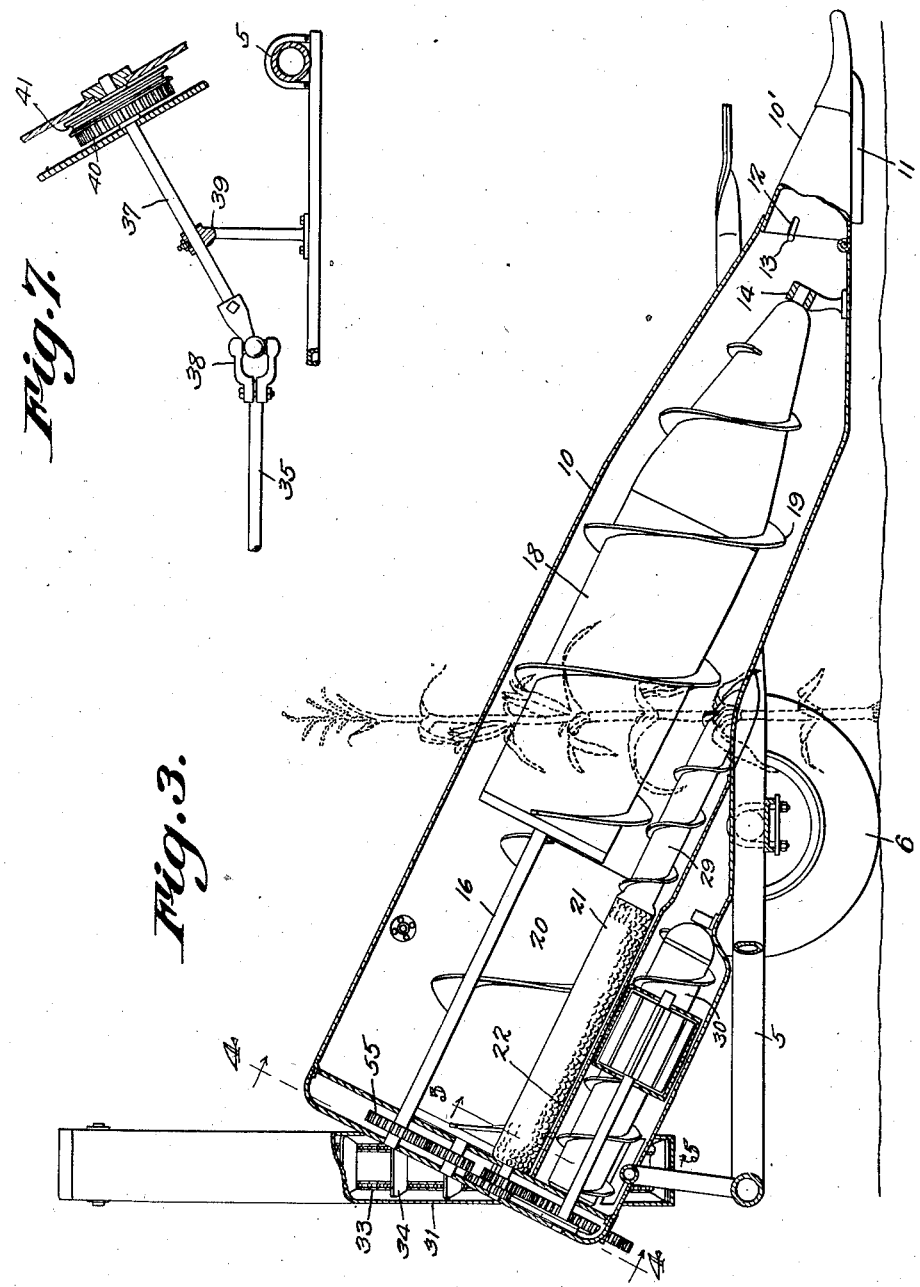
Figure 3 is a longitudinal sectional view through the machine.
Figure 4:
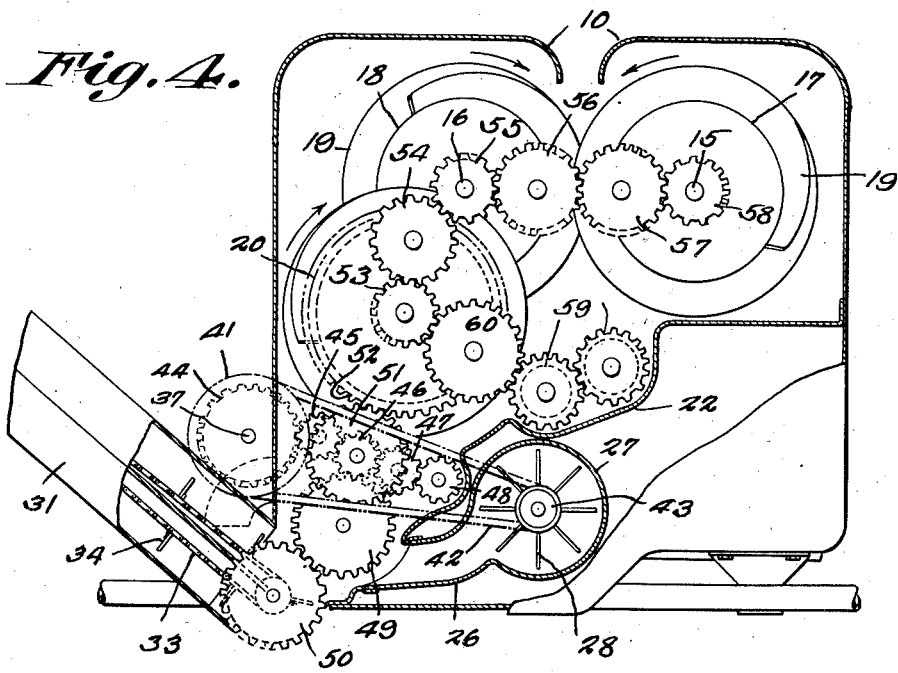
Figure 4 is a sectional view taken on the line 4—4 of Figure 3.
Figure 6:
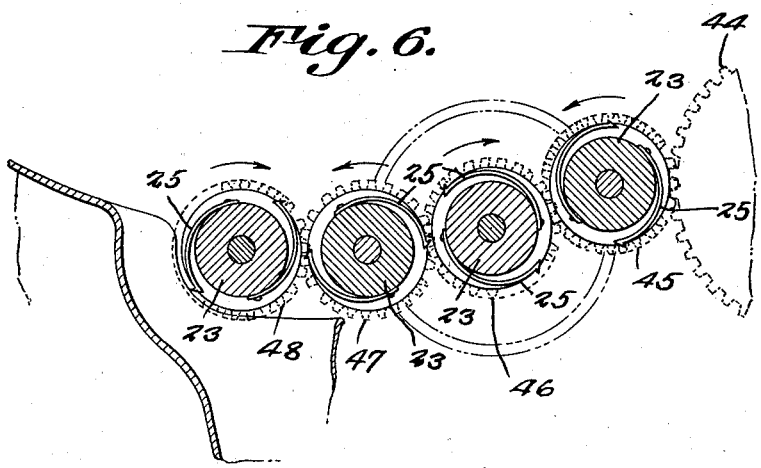
Figure 6 is a sectional view through the husking rolls of the machine.

The side bars of the frame converge at their forward ends, where they are connected and formed with a bolt opening 7, whereby the machine may be connected with the draw bar of a tractor, the draw bar being indicated by the reference character "A," as shown in Figure 2 of the drawings.

Extending laterally from the frame is a connecting bar 8 which may be connected with a carrier, which moves with the machine and which receives the corn after it has passed through the machine.

The machine comprises a metallic housing which is wide at its inner end to receive the gearing used in operating the machine, the forward end of the housing forming elongated feed worm housings 10, having their adjacent longitudinal edges open and spaced apart, so that the stalks of corn of the row through which the machine is being moved may pass therebetween.

As clearly shown by Figure 2 of the drawings, the housing is supported to incline downwardly, the lower front ends of the feed worm housings being flat so that they will move over obstructions such as rocks or clods which may be encountered by the housings as the machine is moving over the ground surface.

It will also be seen that the inner front ends of the housings are inclined outwardly, where they are supplied with pivoted end portions 10', the forward ends of the pivoted end portions being curved upwardly and outwardly to guide the forward ends of the housings over obstructions on the ground surface.

Runners indicated at 11 are formed on the lower surfaces of the pivoted end portions to reduce wear on the pivoted end portions and at the same time assist in elevating the end portions over irregularities in the field.

Elongated slots indicated at 12 are formed in the side wall of each pivoted end section, the slots accommodating the pins 13 that extend inwardly from the side walls of the feed worm housings. These pins not only guide the pivoted end sections in their vertical movement, but provide stops to prevent the pivoted end sections from moving upwardly beyond a predetermined point.

Mounted in the bearings 14 and disposed within the feed worm housings are shafts 15 and 16 on which the feed worms 17 and 18 respectively, are mounted. These feed worms are tubular in formation and have tapered forward ends, providing a wide space between the forward ends of the feed worms, so that the stalks of corn over which the machine moves will be guided between the feed worms. Spiral flanges 19, or blades, are formed on the tubular feed worms and are adapted to feed the corn stalks into the machine to remove the ears of corn therefrom.

As clearly shown by Figure 2 of the drawing, the feed worm 18 is shorter than the feed worm 17, providing a space between the inner end of the worm 18 and inner end of the worm housing, so that the ears of corn may drop downwardly onto the worm 20, to be directed into the machine. The worm 20 is supported below the inner end of the main worm 18, and the ears of corn which are fed rearwardly into the housing of the machine, drop over the inner end of the worm 18, to be picked up by the worm 20 and directed into the snapping and husking rolls of the machine. This structure permits of the reduction in length of the machine, over a machine wherein ears of corn are fed over the end of the worms or spirals, and at the same time provides means to break the fall of the corn prior to its passage to the snapping and husking rolls.

Supported within the housing, and disposed at a point near the lower edge of the worm 20, are snapping rollers 21, which are spaced apart to permit a stalk of corn to pass therethrough. The space between the rollers 21 is not sufficiently wide to permit an ear of corn to pass therebetween, to the end that the ears of corn encountered by the snapping rollers will be snapped from the corn stalk and carried downwardly onto the inclined plate 22, where they are directed to the husking rolls 23, which are arranged in pairs and disposed in a line inclined downwardly toward the lower end 24 of the plate 22. This plate 24 is spaced from the adjacent husking roller 23, to permit the ears of corn to pass therebetween.

These husking rollers 23 are provided with spring fingers 25, the free ends of the fingers 25 being pointed to dig into the husks of the ears of corn passing through the machine, to tear the husks from the ears of corn without damage to the corn. The spring fingers 25 operate in such a way that while they tear the husks from the ears of corn, they rotate the ears of corn to cause them to be fed downwardly toward the plate 24.

Connected with the housing, at a point directly below the plate 24, is a pipe 26 that establishes communication between the lower portion of the housing and the blower housing 27, in which the blower 28 operates, the blower operating to create a blast of air through the lower portion of the housing to cause the husks of the corn to be blown through the outlet pipe 28', clearing the machine of the corn husks.

The forward ends of the snapping rollers 21 constitute feed worms indicated at 29 to direct the corn upwardly between the snapping rolls and prevent the corn from falling to the ground surface, and to pull the lower ears of corn from the stalks.

Reference character 30 indicates a feed worm disposed transversely of the housing, at the forward end of the pipe 26, the feed worm 30 acting to feed the ears of corn after they have been husked, into the conveyer housing 31, which is in communication with the main housing of the machine through the opening 32.

Operating within the conveyer housing 31 is an endless conveyer 33 that embodies spaced chains, to which the blades 34 are connected.

The power shaft is indicated by the reference character 35, and is mounted in the bearing 36, the forward end of the power shaft being connected with the usual power take off gears of the tractor, with which the device is connected. The power shaft 35 connects with the shaft 37 through the universal joint 38, the shaft 37 being mounted in the bearing 39 supported on the frame of the machine. This shaft 37 extends rearwardly, where it supports the pinion 40 and pulley 41, the pinion and pulley being secured to the shaft to rotate therewith. A belt indicated at 42 moves over the pulley 41 and also moves over the pulley 43 mounted on one end of the blower shaft to rotate the blower.

Secured to the shaft 37 is a gear 44 that is in mesh with the pinion 45, that in turn meshes with pinion 46 of the chain of gears that operates the husking rolls. The pinion 46 meshes with the pinion 47 which meshes with pinion 48. The pinions 45, 46, 47 and 48 are mounted on the ends of the husking roll shafts. A gear 49 meshes with the pinion 46 and is rotated thereby, the gear 49 being in mesh with the gear 50 mounted on the lower shaft of the conveyer, so that movement of the gear 49 may be transmitted to the endless conveyer.

Secured to the end of the shaft on which the pinion 46 is mounted is a gear 51 that meshes with the large gear 52, secured to the end of the shaft on which the worm 20 operates, whereby rotary movement is transferred to the worm. The pinion 53 is also mounted on the shaft that carries the worm 20, and the gear 53 meshes with the pinion 54 that in turn meshes with the pinion 55 secured to one end of the feed worm 18, so that movement through the chain of gears will be directed to the feed worm 18. Meshing with the pinion 55 is the pinion 56 that in turn meshes with pinion 57, which meshes with pinion 58, the pinion 58 being secured to the end of the shaft on which the feed worm 17 is mounted to rotate the feed worm.

The snapping rollers 21 are rotated by the meshing gears 59, one of which is in mesh with the gear 60 mounted within the frame, the gear 60 being in mesh with the pinion 53 to receive rotary motion therefrom.

In operation, the machine is moved along a row of corn, the feed worms 17 and 18 straddling the row of corn. As the feed worms rotate, the stalks of corn are fed into the machine and the ears of corn are directed to the snapping rollers 21, which removes the ears of corn from the corn stalks. The ears of corn fall from the snapping rollers onto the plate 22, as shown by Figure 5 of the drawings, from where they move onto the husking rollers 23, where the husks are removed therefrom. The ears of corn now pass downwardly over the plate 24, where they are fed laterally by the feed worm 30 and deposited in the conveyer housing. The ears of corn are carried to the upper end of the conveyer housing by the endless conveyer 33, where they are deposited in a wheeled carrier, with which the device is connected, and which operates at one side of the machine.

In view of the foregoing detailed disclosure, a further disclosure of the operation of the device is believed to be unnecessary.

What is claimed:

1. In a corn harvesting machine, a wheel supported frame, a downwardly inclined housing embodying spaced parallel elongated worm feed housings, the inner longitudinal sides of said housings being open, spaced parallel feed worms operating within the housings, longitudinally thereof the feed worms extending through the open sides of the housings and adapted to contact corn stalks therebetween and feed the corn stalks rearwardly, one of said feed worms being of a length less than the length of the adjacent feed worm, providing a space at the rear end of the feed worms whereby the corn stalks are directed downwardly, snapping rollers mounted at the rear ends of the feed worms, directly thereunder, said snapping rollers adapted to snap ears of corn from the corn stalks, husking rollers adapted to receive the ears of corn from the snapping rollers, removing the husks from the ears of corn, means for feeding the husked ears of corn from the machine including an endless conveyor onto which the ears of corn are delivered, and means including a blower adapted to direct a blast of air through the machine, removing the husks from the machine.

2. In a corn harvesting machine, a wheel-supported frame, a downwardly inclined housing embodying spaced longitudinal worm feed housings, the inner longitudinal sides of said housings being open, feed worms operating within the housings, longitudinally of the housings, said feed worms extending through the open sides of the housings and adapted to contact corn stalks therebetween and feed the corn stalks rearwardly within the housing, one of said feed worms being shorter than the adjacent feed worm, providing a space at the rear end of the feed worms, whereby the corn stalks are directed rearwardly, snapping and husking rollers mounted under the feed worms, a worm disposed under the rear end of a short feed worm between the feed worms and snapping and husking rollers, and said short feed worm adapted to deliver ears of corn to the snapping and husking rollers, and means for conveying the ears of corn from the machine.

3. In a corn harvesting machine, a wheel-supported frame, a downwardly inclined housing embodying spaced longitudinal worm feed housings, the inner longitudinal sides of said housings being open, feed worms operating within the housings, said feed worms extending through the open sides of the housings and adapted to contact corn stalks therebetween and feed the corn stalks rearwardly through the machine, the rear end of one of said feed worms terminating short of the adjacent feed worm providing a space for ears of corn to drop downwardly from the feed worms, a worm disposed under the feed worms and adapted to receive ears of corn from the feed worms, and snapping and husking rollers mounted under the feed rolls for snapping the ears of corn from the corn stalks and husking the ears of corn.

IRVIN E. DORSCHNER.

REFERENCES CITED

The following references are of record in the file of this patent:

UNITED STATES PATENTS

| Number | Name | Date |
|---|---|---|
| 2,160,486 | Oehler et al. | May 30, 1939 |
| 1,984,895 | Rosenthal et al. | Dec. 18, 1934 |
| 1,855,109 | Justman | Apr. 19, 1932 |